Patented June 6, 1944

2,350,653

UNITED STATES PATENT OFFICE 2,350,653

STARCH COMPOSITION

James F. Walsh, Yonkers, and Frank C. Miller, Brooklyn, N. Y., assignors to American Maize-Products Company, a corporation of Maine No Drawing. Application November 30, 1940, Serial No. 367,960

4 Claims. (Cl. 106—214)

This invention relates to a starch composition and to the laundering of articles with the composition. More particularly, the invention relates to a laundry starch composition adapted to be impregnated readily into a fabric, to reduce the tendency of a starched fabric to adhere to the iron during ironing, and to produce finally an improved finish of the fabric.

In conventional laundering, fabric articles are washed, sometimes bleached, soured if bleached, and blued, rinsing being effected after each step. The articles are then wrung, immersed in a cooked starch solution, dried, then moistened, and ironed.

In such conventional operation, the starch solution films unevenly over the surface of the article and often shows objectionable highlights and "shiners" on the finished ironed surface. There is difficulty in obtaining desired uniformity of color, particularly of white articles that have been imperfectly cleaned or bleached. There is objectionable sticking or adhering of the starched fabric to the ironer. Also, there is objectionable harshness of the starched product, particularly when the proportion of the starch used is large, as in collars and cuffs of men's shirts.

The preferred embodiment of the present invention provides a composition and process that makes possible the desired penetration of a starch suspension into fabrics, establishes the desired whiteness of normally white fabrics, reduces the tendency of the starched article to adhere to the iron, reduces the harshness of the finished starched and ironed fabrics, and, in general, gives a finish of improved appearance.

The invention comprises a composition including starch, a finely divided pigment mixed with the starch, and an electrolyte component including a water soluble compound, such as a salt, that when dissolved in water as described herein is slightly alkaline.

In the preferred embodiment, the composition includes also starch conversion syrup solids in dried condition. The syrup solids promote penetration of pigment into the fabric and flexibilize appreciably the final starch film, so as to reduce the harshness of the film.

The starch used may be one of the common kinds such as corn, wheat, potato, rice or tapioca starch. For best results, the starch should be thin-bodied, as for example, a starch of alkali fluidity 30 to 90 and advantageously about 40 to 60 as measured by the standard test. For best results, the starch should be finely divided.

The pigment used should be white, very finely divided, adapted to be mixed intimately and uniformly with the starch, without injurious effect upon the starch or upon textiles of the kind ordinarily subjected to starching, free from discoloration on contact with usual laundry equipment, and readily dispersible in water in the presence of the starch. The pigment should have a very high covering power and a minimum chalking effect upon the starch in the ironed article for a given amount of pigmentary effect produced. We have used to advantage such pigments composed of particles predominantly of size not substantially larger than one micron and suitably less than half a micron. Particularly good results have been obtained when the pigment includes titanium dioxide or titanated lithopone. Other white pigments, however, may be used, as, for example, zinc oxide or lithopone alone.

As the electrolyte component, there is used a somewhat alkaline water soluble electrolyte or mixture of electrolytes, particularly salts that are somewhat on the alkaline side of neutrality and give when dissolved to a 3% solution in water a pH that is between 8 and 10, suitably 8.5 to 9.5. There may be used to advantage a mixture including borax or other alkali metal borate, an alkali metal phosphate such as hexa or tetra sodium phosphate, or compounds of like alkalinity when dissolved in water. Such salts are associated preferably with other neutral salts such as sodium chloride, sodium nitrate, or potassium sulfate. The electrolyte component serves to reduce adherence of the starched article to the iron during ironing.

The syrup solids used are those formed by converting starch to a syrup, refining the syrup, and then lowering the moisture content so as to form a non-sticky solid material, all in conventional manner. Thus, corn starch may be converted to sugars and dextrines, the resulting syrup refined, concentrated, and then solidified, as by spray drying, to give finely divided solid material containing not substantially more than 4 per cent of water. For some purposes another reducing sugar, as, for example, invert sugar or dextrose, may be substituted part for part for the syrup solids.

Proportions of the several materials may be varied considerably.

For 100 parts of starch, there is used to advantage pigment in the proportion of 2 to 10 parts, starch conversion syrup solids 2 to 10 parts, and electrolyte component 5 to 20 parts. A composition that has been used to advantage is the following:

| | Parts |
|---|---|
| Starch, thin boiling | 83 |
| Pigment—titanium dioxide | 2 |
| Dried corn syrup solids | 4 |
| Electrolyte component: | |
| Borax | 8 |
| Sodium chloride | 3 |
| Total | 100 |

In general, the proportion of pigment used should be adequate to establish the desired color and effects in the finished product but below the amount which, if used, would cause the starch in the ironed article to be excessively brittle or chalky.

The electrolyte component is used in amount sufficient to cause the proper dispersibility or suspendibility of the starch composition in cold water, to make the insoluble materials of the composition readily redispersible in water after they have settled from a suspension first made, and to eliminate objectionable sticking of the starched goods to the ironing member during ironing. Amounts of the extender in excess of about 20 parts for 100 parts of the starch are unnecessary and therefore are not recommended.

The starch conversion syrup solids are used in proportion adequate to promote penetration of the composition into fabrics and to flexibilize the finished, dried, and ironed film to the extent of reducing the harshness of highly starched articles.

The whole starch composition as used is suspended in cold water, ordinarily in the proportion of a few tenths part to 100 parts water. The proportion may be as low as 0.1% of the composition on the weight of the water, or as high as 10% in the case of starching of collars and cuffs.

In using the starch composition of the kind described in home laundering, the moist washed article, say, direct from the wringing operation, or containing about the proportion of water left by a laundry centrifuge is drained and then immersed in the suspension of the composition. After the article has been worked and patted in the suspension for a few minutes, the suspension will have become impregnated throughout the article. The article is then wrung, as in a laundry centrifuge, to remove excess of the water, dried, remoistened, and conditioned for ironing.

The conditioned article is then subjected to ironing in usual manner, the temperature which prevails during the ironing causing the pasting of the starch in situ, the formation of the starch and starch conversion syrup solids into a film which serves as a binder for the pigment, and drying of the starched and ironed article.

There is thus produced an article which is substantially free from localized over-concentrations of starch and the usual highlights or "shiners."

The pigment present serves to make exceptionally white the surface of laundered white articles. While our pigmented starch composition is intended primarily for use on white goods, goods of certain other colors, as for example, some blues or pinks, may be used.

A typical example of the making and also the use of our improved starch composition in commercial laundries follows.

Thin-boiling, i. e. thin-bodied, powdered, dried starch of alkali fluidity 40 is mixed intimately with powdered sodium chloride, powdered borax, and titanium dioxide pigment, proportions of these materials to each other being as stated above.

A fourth ounce of the resulting mixture is then suspended in 1 gallon of cold water, the whole being agitated to insure thorough mixture and suspension of the starch composition. Rinsed, wrung, and blued fabric articles are then immersed in the suspension.

Or, the starch-pigment-electrolyte mixture is added in dry form to a laundry washing wheel containing the blued clothes and just sufficient water to give the required concentration of the added starch, as, for example, a gallon of water to a fourth ounce of the starch composition. After the dry starch is added to the wheel, the clothes are run for 3 to 4 minutes or for a time sufficient to thoroughly impregnate the clothes with the starch composition. The excess starch suspension is then drawn from the wheel.

Regardless of the details of the method used for impregnating the goods, the starched goods are passed to the wringer or centrifugal, for final wringing out of the excess water and suspended starch composition. The moist, wrung clothes are then shaken out and then ironed.

In the preferred embodiment, the details of the specific examples given, for either home or commercial laundry use, are followed, except that starch conversion syrup solids in finely divided dried form containing not substantially more than about 4 per cent of water, are incorporated in the starch composition. The proportion of the syrup solids used is approximately 2 to 10 parts for 100 parts of the starch.

In preparing the starch composition originally, the starch syrup solds, finely divided pigment, and electrolyte component may be milled together. Or, they may be comminuted separately and be then well mixed.

In one embodiment of the invention, the mixing is made wet. In this embodiment thin-boiling or other modified starch, after the final washing in the usual process of manufacture, is allowed to settle. The excess water is decanted and replaced with an aqueous solution of the starch conversion syrup solids and electrolyte component and suspension of the pigment. The starch is then resuspended, by agitation, to cause uniform distribution of all the materials. The composition is then pumped through a filter. The filtered starch composition remaining as filter cake is passed to the drier and dried under conditions ordinarily used to produce such special physical forms of starch as pearls or crystals. The starch composition is then ground.

The concentration of the syrup solids and electrolyte component in the water added to the washed starch in the above procedure is such that, after the whole composition is filtered, the several materials are present in the filter cake in about the proportions stated above as satisfactory.

It will be understood that the details given are for the purpose of illustration and that variations within the spirit of the invention are intended to be included within the scope of the appended claims.

We claim:

1. A laundry starch composition comprising a major proportion of thin boiling starch of alkali fluidity approximately 30 to 90 and a minor proportion of intimately admixed materials including a fine white pigment predominantly of particle size smaller than about 1 micron and a salt component that when dissolved in water to a 3% solution gives a pH of approximately 8 to 10, the pigment and salt component, on use of the composition on a textile and subsequent ironing of the starched textile, reducing the high lights and the tendency of the composition to adhere to the iron during ironing.

2. A laundry starch composition comprising a major proportion of starch and a minor proportion of intimately admixed materials including a fine white pigment predominantly of particle size smaller than about 1 micron, a salt component that when dissolved in water is alkaline, and finely divided starch conversion syrup solids containing not more than about 4 per cent of water, the starch conversion syrup solids being present in the proportion of approximately 2 to 10 parts for 100 parts of starch and serving after pasting of the starch and application to a fabric, to promote penetration of the fabric by the pasted starch and to decrease the harshness of the resultant starch film in the finished ironed fabric.

3. A starch composition as described in claim 2, the salt component including borax, the starch being thin-boiling and of alkali fluidity about 30 to 90, and the proportions of admixed materials for 100 parts of starch being approximately as follows: pigment 2 to 10 parts, salt component 5 to 20 parts, and starch conversion syrup solids 2 to 10 parts.

4. A starch composition as described in claim 1, the salt component consisting of a mixture of borax and sodium chloride.

JAMES F. WALSH.
FRANK C. MILLER.